April 12, 1960  F. G. VON KUMMER ET AL  2,932,796
TRIGGER CIRCUITS
Filed Jan. 29, 1958
*Fig.1*
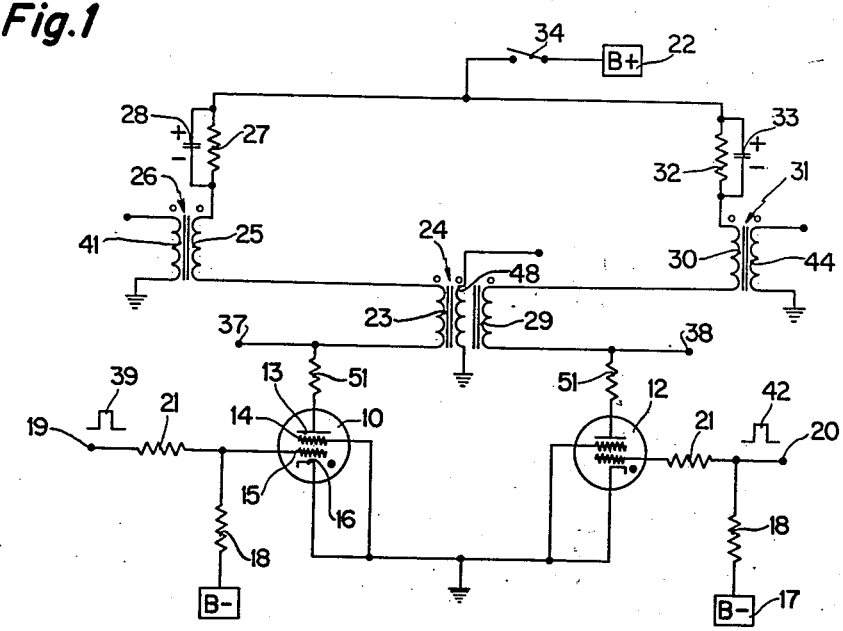
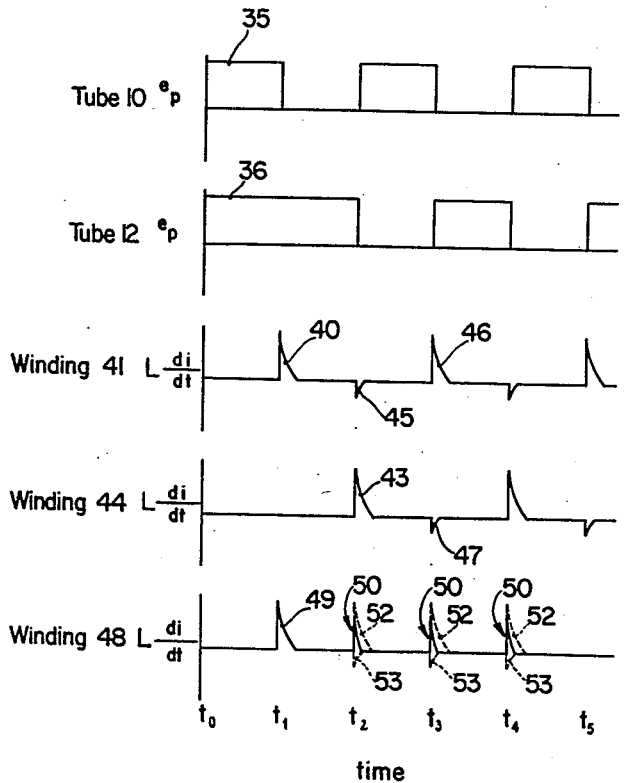
*Fig.2*
INVENTORS
FERDINAND G. von KUMMER
ANTHONY H. SANTUCCI
BY Thomas S. Ross
Joseph R. Spalla
ATTORNEYS

United States Patent Office 2,932,796
Patented Apr. 12, 1960

2,932,796

TRIGGER CIRCUITS

Ferdinand G. von Kummer, Bloomfield, and Anthony H. Santucci, Wethersfield, Conn., assignors to Royal McBee Corporation, Port Chester, N.Y., a corporation of New York Application January 29, 1958, Serial No. 711,917

1 Claim. (Cl. 328—205)

This invention relates to trigger circuits; more particularly it relates to a trigger circuit which is considerably more versatile than those now in use; and specifically it relates to a thyratron trigger circuit wherein coupling of the plate circuits of the two thyratrons forming the trigger circuit is effected through the windings of a pulse transformer.

Trigger or flip-flop circuits find numerous applications as control devices in data processing and other various systems wherein they are used to produce an effect equivalent to opening or closing a switch in response to control signals applied to one or the other of their inputs. In many applications it is desirable to provide a trigger circuit which will be in a predictable state when power is applied to the circuit; beocme a bistable circuit after either of its sides are rendered conducting; produce a positive or a negative signal from either side when either of its sides are rendered conducting; produce a positive and a negative signal when one of its sides is rendered conducting; and which will produce a positive or a negative signal when either side is rendered conductive. Insofar as is known, in order for any of the trigger circuits now in use to functon in all the above mentioned modes requires a redesign and/or the addition of circuitry thereto, thereby rendering them inflexible and relatively expensive.

The present invention provides a versatile trigger circuit comprising a pair of thyratrons which have their plate circuits inductively coupled through the windings of a pulse transformer and an output pulse transformer in each of their plate circuits. In addition an "or" circuit is simply provided by inductively coupling a third winding to the plate coupling transformer. This basic circuit will function in any of the aforementioned modes without the necessity for redesign or the addition of further circuitry in that to realize positive and/or negative outputs only requires the reversal of the leads to the output terminals of the pulse transformer.

An additional feature of the invention is the fact that the output signals are not limited to one value but may be changed by changing the turns ratio between the secondary and primary windings of the pulse transformers. A further attribute of the invention is that the output signals can be made higher than the circuit supply voltage.

An object of the invention is to provide a trigger circuit having at least three stable equilibrium conditions.

Still another object of the invention is the provision of a trigger circuit from which positive or negative signals may be derived from either side when either of its sides are rendered conducting.

Another object of the invention is the provision of a bistable trigger circuit from which positive and negative signals may be derived from its respective sides when the circuit flips from one of its stable conditions to another in response to a trigger pulse.

A further object of the invention is to provide a trigger circuit from which a positive or a negative output signal may be derived whenever one or the other side of the trigger circuit is rendered conductive.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 shows a schematic diagram of a trigger circuit in accordance with the invention; and Fig. 2 shows diagrams of the output voltage waveforms obtainable from the trigger circuit of Fig. 1.

Referring now to Fig. 1 of the drawings, which illustrates a preferred embodiment there is shown a pair of thyratron tubes 10 and 12 each having a plate 13, a screen grid 14, a control grid 15 and a cathode 16. The cathodes and screen grids are directly returned to ground thereby to provide a balanced circuit. The control grids 15 are connected to bias voltage supplies 17 through biasing resistors 18 whereby the grid cathode potentials of the tubes are normally below the potentials necessary to fire the tubes. Input terminals 19 and 20 respectively, to which positive trigger pulses are to be applied, are connected to the grids of tubes 10 and 12 through current limiting resistors 21. The plate of tube 10 is connected to a plate supply voltage source 22 through the left hand winding 23 of a plate coupling transformer 24, through the primary winding 25 of an output pulse transformer 26 and a parallel arrangement comprising a plate load resistor 27 and a capacitor 28. Tube 12 is similarly connected to source 22 through the right hand winding 29 of transformer 24, the primary winding 30 of an output pulse transformer 31 and a parallel circuit arrangement comprising a plate load resistor 32 and a capacitor 33. Capacitors 28 and 33 are adapted to produce maximum pulse amplitudes at the transformer windings when their associated tubes fire. The values of the resistors, capacitors and inductive windings are chosen so that the plate cathode circuits will not oscillate.

Referring now to Fig. 2 there are shown exemplary voltage waveforms at different points on the circuit all drawn on the same time base. As will more fully appear hereinafter, the trigger circuit illustrated has four stable conditions of operation i.e. (0, 0), (0, 1), (1, 0) and (1, 1) where 1 represents a conducting tube and 0 a non-conducting tube.

Upon closure of switch 34 at time $t_0$ the voltages at the plate of tubes 10 and 12, as represented by curves 35 and 36, will be B+. Both tubes at this time will be and will remain non-conducting until one of them is fired. This condition represents a 0, 0 equilibrium state. If desired, voltage waveforms 35 and 36 may be obtained from the output terminals 37 and 38 respectively. A control signal 39 applied to the grid of tube 10 at time $t_1$ will fire tube 10; capacitor 28 will immediately charge with the polarity shown through tube 10 and current limiting resistors 51. The rate of change of current in the primary winding 25 of transformer 26 will cause a transient voltage pulse 40 (Fig. 2) to be induced in its secondary winding 41. As is understood after tube 10 fires the grid loses control; hence tube 10 will continue to conduct after the control pulse is removed with the result that a stable 1, 0 condition will obtain and persist until a positive control signal 42 is applied at time $t_2$ via terminal 20 to the grid of tube 12 thereby rendering it conductive. The rate of change in current in the plate circuit of tube 12 will cause a voltage pulse 43 (Fig. 2) to be induced in the secondary winding 44 of output pulse transformer 31. In addition the rate of change of current in the plate circuit of tube 12 will cause a voltage to be induced in the left hand winding 23 of plate coupling transformer 24, and since the windings of the plate coupling transformer are wound in the direction indicated by the dot above each winding, the voltage induced in the left hand winding will be of such sign that the potential on the plate of tube 10 will drop below that necessary to sustain conduction and tube 10 will cut off with capacitor 28 discharging through resistor 27. When tube 10 cuts off, the rate of change of current in the plate circuit thereof will cause a negative pulse 45 of lesser amplitude than pulse 40 or 43 to be induced in the secondary winding 41 of output transformer 26.

The amplitude of the negative pulse 45 is smaller than the positive pulses 40 and 43 since the steady state current flowing through the tube 10 is less than the peak current flowing therein when it was fired. A stable 0, 1 condition of operation will obtain and will persist until tube 10 is again fired by a control signal delivered at time $t_3$ to the grid of tube 10. As a consequence the circuit will flip with 10 conducting and 12 non-conducting with pulses 46 and 47 obtaining at the terminals of windings 41 and 44. The circuit will continue to flip back and forth upon application of successive control pulses to terminals 19 and 20.

In accordance with the invention the circuit may be switched to a (1, 1) state from a quiescent (0, 0) state by applying control signals to terminals 19 and 20 simultaneously, or from a bistable state (0, 1) or (1, 0) by maintaining a control signal on the grid of the conducting tube when the non-conducting tube is fired. For example if tube 10 is conducting and tube 12 is fired, if the control signal on the grid of tube 10 is still being applied, tube 10 only momentarily cut off by the transient caused by the firing of tube 12 will immediately be refired by the control signal maintained on its grid. The tubes will remain in the 1, 1 state until switch 34 is opened.

As is obvious signals of reverse polarities from those shown may be obtained simply by reversing the connections to the terminals of the secondaries of the output transformer.

As shown in Fig. 1 a third winding 48 is inductively coupled to the plate coupling transformer. When tube 10 fires at $t_1$ a positive transient signal 49 will be induced in winding 48 and when tube 12 is fired at time $t_2$ a transient signal 50 will be induced in winding 48.

The amplitude of transient signal 50 will be less than that of signal 49 since it is the resultant of the positive spike 52 induced in winding 48 due to the rate of change of current in winding 29 and the negative spike 53 induced in winding 48 as a result of the rate of change of current in winding 23 which is smaller since the steady state current in tube 10 is much less than the peak current in tube 12. As may be seen therefore a net positive signal may be obtained from winding 48 if either tube 10 or 12 is fired. As is apparent the polarity of the signals derived from winding 48 will be determined by the connection of the output leads to the terminals of winding 48.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

A flip flop circuit comprising a first and second thyratron each having at least a plate, a grid and a cathode, plate cathode circuits for said thyratrons, a common source of plate supply voltage, switch means for connecting and disconnecting said supply voltage to said plate cathode circuits, inductance coils connected in series in each of said plate cathode circuits, a parallel resistor capacitor arrangement connected in series in each of said plate cathode circuits, said inductance coils being wound in the same direction and arranged to form a pulse transformer whereby said plate cathode circuits are inductively coupled, means for maintaining both thyratrons cut off when said supply voltage is connected to the plate cathode circuits, means individual to each of said thyratrons for applying input pulses to the grids of said thyratrons whereby bistable operation is obtained in response to serially received input pulses and whereby both thyratrons conduct in response to inpulses simultaneously applied to said grids, pulse transformers in each plate cathode circuit for driving an output pulse whenever the thyratron associated therewith is fired, and a third coil wound in the same direction as the coils forming said plate coupling pulse transformer inductively coupled thereto for developing a unipolar pulse upon conduction of either of said thyratrons.

References Cited in the file of this patent

UNITED STATES PATENTS

| 2,025,911 | Stansbury | Dec. 31, 1935 |
| 2,328,671 | Pfleger | Sept. 7, 1943 |
| 2,692,963 | Hathaway | Oct. 26, 1954 |

FOREIGN PATENTS

| 378,868 | Great Britain | Aug. 16, 1932 |
| 436,935 | Great Britain | July 17, 1934 |